United States Patent [19]

Bliss

[11] 3,816,711

[45] June 11, 1974

[54] DECODING APPARATUS AND SYSTEM FOR AN ELECTRICALLY ENCODED CARD

[76] Inventor: William W. Bliss, 401 N. Huntley, Los Angeles, Calif. 90048

[22] Filed: Dec. 11, 1972

[21] Appl. No.: 313,698

Related U.S. Application Data

[60] Division of Ser. No. 219,724, Jan. 21, 1972, abandoned, which is a continuation of Ser. No. 328,290, Jan. 30, 1973.

[52] U.S. Cl.......... 235/61.11 A, 40/2.2, 340/149 A, 235/12 C

[51] Int. Cl...... G06k 19/02, G06k 7/04, G09f 3/02

[58] Field of Search 235/61.12 C, 61.12 R, 61.11 A, 235/61.12 N, 61.7 B; 200/46; 340/149 A, 174 MA; 194/4 R

[56] References Cited

UNITED STATES PATENTS

| | | | |
|---|---|---|---|
| 2,353,061 | 7/1944 | Oldenboom | 235/61.12 C |
| 2,817,824 | 12/1957 | Albright | 235/61.12 C |
| 2,889,532 | 6/1959 | Slack | 235/61.12 N |
| 3,028,080 | 4/1962 | Schwend | 235/61.12 C |
| 3,028,659 | 4/1962 | Chow | 235/61.12 C |
| 3,378,920 | 4/1968 | Cone | 235/61.12 C |
| 3,399,473 | 9/1968 | Jaffe | 40/2.2 |
| 3,430,200 | 2/1969 | Barney | 340/149 A |
| 3,513,441 | 5/1970 | Schwend | 340/149 A |
| 3,702,464 | 11/1972 | Castrucci | 235/61.12 C |

*Primary Examiner*—Daryl W. Cook
*Assistant Examiner*—Robert M. Kilgore
*Attorney, Agent, or Firm*—Jessup & Beecher

[57] ABSTRACT

A decoding system is provided for an electrically encoded card, or the like. The card comprises a multi-layered laminated structure with a plurality of printed circuit elements embedded therein. One of the embedded printed circuit elements comprises a master circuit which is standard, for example, for a group of cards; and another of the embedded circuit elements comprises an encoding circuit which identifies and is different from each card and which, in each instance, completes selected circuit breaks in the master circuit. The card is checked out by the decoding system of the invention which contains, for example, a similar master printed circuit element, and in which complementary adjustments must be made to the connections of the aforesaid encoding circuit in order to complete the circuit and check out the card.

3 Claims, 3 Drawing Figures

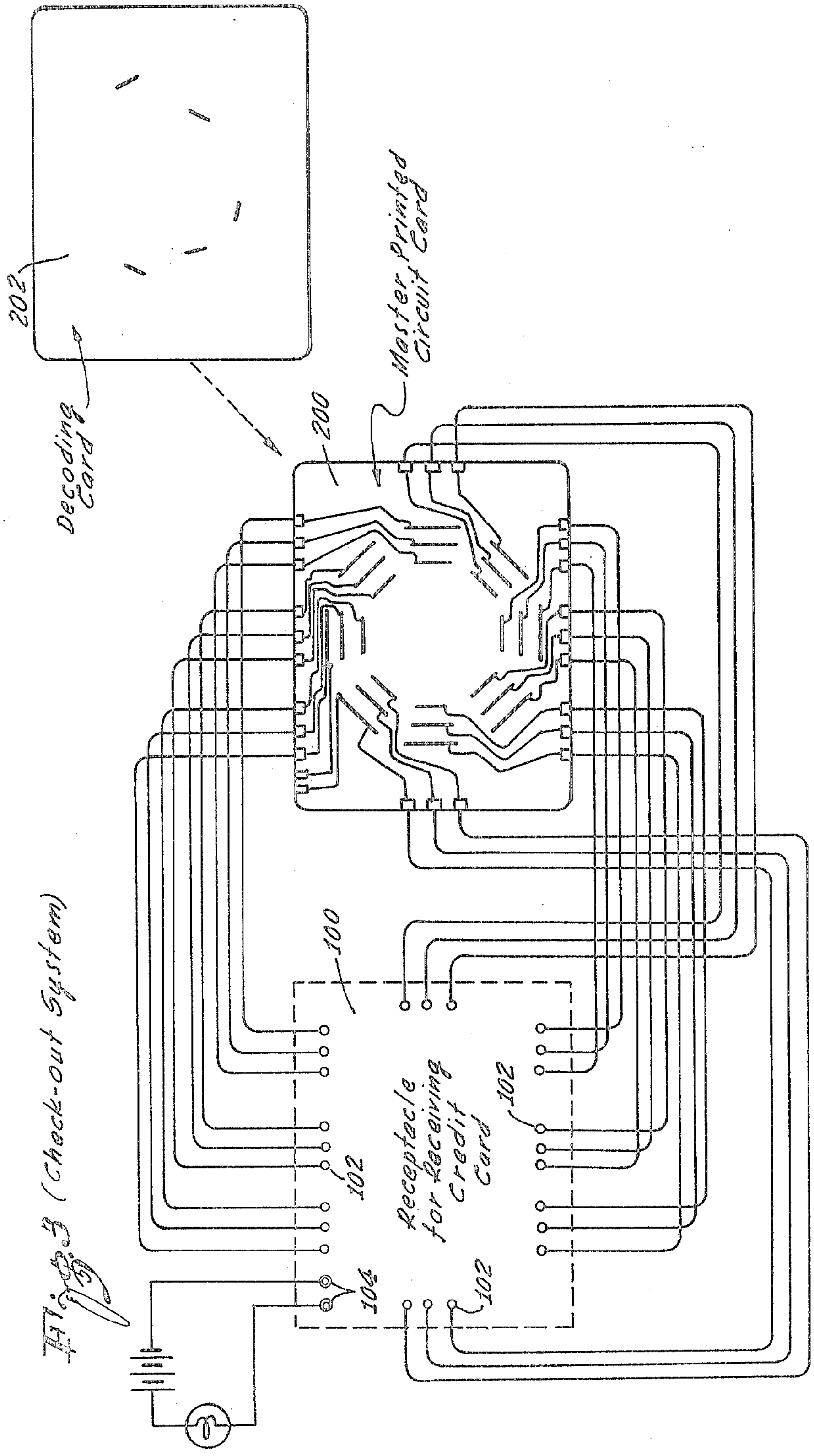
Fig. 3 (Check-out System)

DECODING APPARATUS AND SYSTEM FOR AN ELECTRICALLY ENCODED CARD

This is a division of Copending application Ser. No. 219,724 filed Jan. 21, 1972, which has now been abandoned, and which has been replaced by continuation patent application Ser. No. 328,290 filed Jan. 30, 1973.

BACKGROUND OF THE INVENTION

Although credit cards are in widespread use today throughout the world, they are subject to misuses which cost the industry many millions of dollars a year. This is because of the lack of a simple, inexpensive and foolproof system which will prevent the card from being used by an unauthorized person, and which also will prevent further use of the card by a person whose account has become delinquent.

The electrically encoded card of the copending application Ser. No. 219,724 provides a simple and efficient means for overcoming the aforesaid disadvantages of the prior art credit cards and checkout systems, as well as providing additional advantages which are beyond the capabilities of existing cards and systems. For example, the card may be used in a system in which the user alone is aware of a certain code number which must be set into the checkout system before his card will be validated. In this way, he is protected from the unauthorized use of his card in the event it should become lost or stolen.

In addition, the card may be formed so that information concerning the user may be programmed into the card. This information may include, for example, the age, height, race, etc., of the user, all of which are read by the checkout system and apparatus at the point of use of the card to protect the user against the unauthorized use of his card. Other information also may be programmed into the card, such as credit rating, expiration date, etc., so as to protect the retailer from the use of the card by persons whose accounts have become delinquent, or have expired.

The cards may be used in conjunction with a central computer system to widen their field of utility and, as such, may be tied into a central automatic billing system. In this way, all pertinent information of each transaction, properly identified, may be carried to the account of the customer, so that a running balance of the account may be maintained for periodic automatic billing purposes. The same concept may be applied to the use of the card in conjunction with a bank account, in which case the card would function in lieu of checks, as a means for drawing on the account. Likewise, the card may be used as a telephone credit card, with information on the card automatically carrying appropriate accounting data to the account of the subscriber at the subscriber's telephone number which is programmed into the card.

Another and different use for the card may be for programming airline flights. In this case, each retail sales outlet throughout the country would be issued groups of cards, and each of the cards would represent a different flight. The master circuit on each card would then represent the seating capacity for a particular flight. As the seats for a particular flight are sold, the central computer system effectively completes corresponding bridging circuits for the master circuit, so that a "full" indication is obtained when all the seats of that particular flight are sold. Thus, each card of a particular group, as distributed around the country, represents the seating capacity of one particular flight, and as the seats are filled the circuits close automatically at the central computer station until the flight is booked. The cards of the particular group may be used over and over for that particular flight, as long as it is in existence.

SUMMARY OF THE INVENTION

A decoding system for a multi-layered card is provided. The card includes a master circuit which is slaved to a similar master circuit in the checkout system, and additional encoding circuitry which, in conjunction with complementary decoding circuitry in the decoding system, allows current to flow through missing links in the master circuits.

BRIEF DESCRIPTION OF THE DRAWINGS

FIG. 3 is a schematic representation of a second type of checkout or decoding system for the card.

DETAILED DESCRIPTION OF THE ILLUSTRATED EMBODIMENT

The encoded card, and the checkout or decoding systems of the invention, will be described herein in a credit card environment. However, it will become evident as the description proceeds, and as explained above, that the card has much wider and far reaching uses. Specifically, the invention is concerned with a read-out or decoding system for checking the card which is capable of identifying the information which has been programmed into each particular card.

Figure 1:
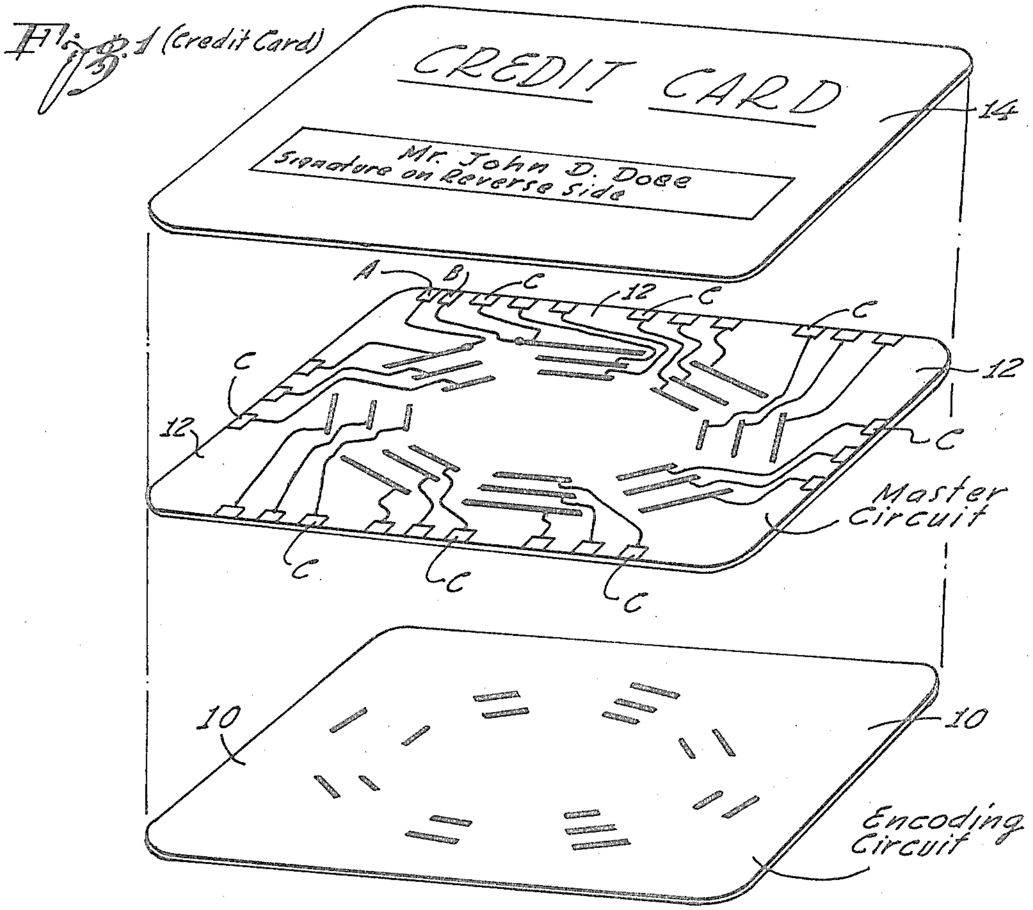
FIG. 1 is an exploded perspective representation of a credit card for use with the decoding system of the invention.

As shown in FIG. 1, the credit card is made up of a plurality of sheets, for example, sheets 10, 12 and 14, of suitable material. The sheets 10, 12 and 14 may be composed of an appropriate organic polymer, such as polyester, or other plastic material, or the like, as is usual with present day credit cards.

The sheet 12 carries a printed circuit, for example, formed on its upper surface which constitutes the "master circuit" of the card. The printed circuit on the sheet 12, as shown, may be made up of a multiplicity of discontinuous concentric printed circuit elements or segments, all of which must be electrically inter-connected, in order to form a complete electric circuit. The electric circuit is established, for example, between terminals A and B; the terminals being formed, by usual metallizing techniques, at the edge of the sheet 12. As shown, each segment of each printed circuit element extends between two metallized holes in the card 12. Moreover, each segment is connected, by appropriate printed circuit connections, to further metallized terminals C extending around the edge of the card.

A further printed circuit, designated the "encoding circuit" is formed on the upper surface of the sheet 10 by usual printed circuit techniques, and the latter circuit comprises a plurality of printed circuit conductor segments which are positioned to bridge selected ones of the voids in the master circuit on the sheet 12, and to inter-connect the adjacent electric conductors of the master circuit. This is achieved by providing connections at the ends of each circuit element on the sheet 10 which engage the corresponding metallized holes extending through the sheet 12, so that an electric contact is establsihed across the adjacent segments of the master circuit on the sheet 12.

The encoding circuit 10 is selected so that certain of the conductors in the master circuit are left unconnected, and these remaining circuit breaks must be completed in the circuitry of the checkout system before an electric circuit is established across the terminals A and B so as to indicate a validation of the card.

It will be appreciated that the particular code of the encoding circuit 10 is formed during the manufacture of the card, and this code may be selected so that the checkout system must fulfill certain criteria before a validation is achieved. This criteria in a simple system, for example, may merely be a certain code number which is known to the user of the card, and which is set manually into the checkout system, so that a validation is achieved when the proper code number is communicated. In more complex systems, a central computer is used to meet various different criteria which have been programmed into the card before the validation is secured. For example, the computer furnishes the proper identification of the user, corresponding to the code selected by the encoding circuit, before a validation is established.

The various layers of the card of FIG. 1 are then sealed together at the factory, and the top layer 10 may be embossed or printed with the usual credit card or other designations. It is preferable that the card be manufactured so that the various layers become sealed together into a unitary mass, so as to preclude unauthorized tampering with the card. Also, means may be incorporated into the card so that the circuits themselves become destroyed if any attempt is made to pry the layers apart, and so that the card itself becomes discolored when such an attempt is made.

Figure 2:
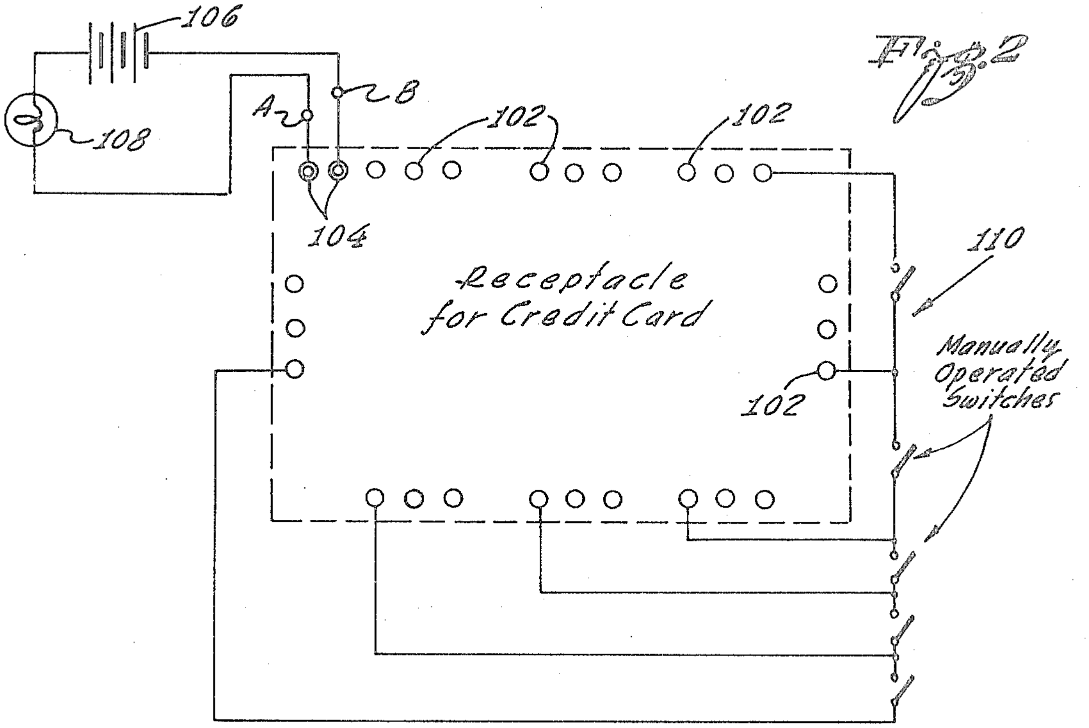
FIG. 2 is a schematic representation of one type of checkout or decoding system for the card of FIG. 1 in accordance with the invention.

The card shown in FIG. 1 may be used, for example, in conjunction with a simple checkout system such as shown in FIG. 2. An appropriate receptacle 100 is provided which includes terminals 102 that make connection with the various terminals C on the card, when the card is placed in the receptacle. The receptacle also includes a pair of terminals 104 which make contact with the terminals A and B on the card. The terminals 104 are connected, for example, to a power source 106 and indicator 108, the connection being such that when a circuit is completed between the terminals 104, indicating the validation of the card, the indicator lamp 108 will glow. Of course, other appropriate oral or visual indicators may be used to indicate the validity of the card, or appropriate controls may be initiated, such as locking or unlocking doors, etc.

In the simple system of FIG. 2, the terminals 104 are each connected to a switching circuit 110, which is madeup of a plurality of manually operated switches. The switches may be mounted, for example, on an appropriate control board adjacent the checkout device. Then, in this particular instance, when the user furnishes the proper code for his card, the retailer then actuates the corresponding switches in his switching circuit, so that the missing links of the master circuit on the layer 12 are completed, so that a complete circuit is established in conjunction with the particular encoding circuit on the layer 10 and so that the lamp 108 will glow, indicating that the proper code has been communicated.

However, as indicated above, the card may be used in conjunction with more complex checkout systems, such as designated sc hematically in FIG. 3. In the latter system, the receptacle 100 is connected to a master printed circuit card 200 which is incorporated into the system, and which compares with the master circuit on the layer 12 of the card of FIG. 1. It will be evident, of course, that the master circuit card 200 may itself be removable, either physically or electronically, so that for any particular group of cards being checked by the system, a master circuit card 200 is incorporated into the checkout system corresponding to the master circuit of the card being checked.

A computer, or other means, then physically or electronically searches through its memory for a decoding card, such as designated 202 in FIG. 3, which will complement the encoding circuit 10 of the particular card being tested, and when that encoding card is found, the computer displays the corresponding data which represents the information which has been coded into the card by its particular encoding circuit, or initiates appropriate control effects.

The checkout system may incorporate appropriate memories and circuitry to simulate the master circuit card 200 and decoding card 202. For example, the particular format of the master circuit of a particular card may be stored in an appropriate register in the checkout system, and a comparison may be made within the system until the appropriate decoding combination is found. At that time, the display of the system will incorporate the various data which has been programmed into the card by its encoding circuit.

It will be appreciated, therefore, that the apparatus for checking out the card may be incorporated with other devices such as credit card print-out machines, computers, electronic scanners and the like. In each instance, the read-out apparatus includes an actual or simulated master circuit which matches the master circuit on the card being checked, so that the two circuits may be slaved to one another. As described above, the master circuit of the read-out system is connected to circuitry which by its nature may be changed manually or electronically in order to duplicate all the possible combinations of the encoding circuit of the card until a match is made.

As also mentioned, manual means such as a keyboard, dials, levers, and other type of switch actuating means may be used in the read-out apparatus to complete the missing links in the encoding circuit of the card being checked. As also described, the read-out apparatus may be electronically controlled so that it automatically reads out all possible combinations to find the missing combinations, and then displays corresponding data which has been programmed into the system and which corresponds to the match when it is made.

The invention provides, therefore, a decoding system for a multi-layered card. The card includes a master circuit that can be slaved to a similar master circuit in the decoding system by terminal contacts, and which also includes encoding circuits which complete certain missing links in the master circuit, but which require other circuitry in the decoding system before the circuit is fully complete so as to validate the card.

In the manufacture of cards, the various layers may be made in multiple runs and coded, according to the data which is to be programmed into each card. When a subscriber is offered a card, the top layer 14 may be embossed with his name and account number, in accordance with usual procedures, and this layer is then sealed to the other layers, and the resulting combination is filed with the owner's name. The completed card is then mailed separately without the code, for example, so as to prevent mail theft of the cards. Several days later, the subscriber may be mailed his code number, which, in accordance with the embodiment described in conjunction with FIG. 2, he presents to the retail outlet each time he uses his card.

As also described, the card may be programmed to include other information concerning the user, all of which is established in a predetermined program, to be visually displayed by the central computing system, when the particular decoding combination is derived for completing the circuit established by the combination of the master circuit and encoding circuit in the card of FIG. 1.

Although particular embodiments of the checkout or decoding system of the invention have been described, modifications may be made. It is intended to cover all such modifications in the following claims.

What is claimed is:

1. Read-out apparatus for a card, said card having a master circuit formed therein comprising a matrix having a first plurality of electrical conductors spaced and insulated from one another, and further comprising a second plurality of electrical conductors mounted on said card spaced and insulated from one another and respectively bridging selected pairs of the conductors of the first plurality in accordance with a predetermined code, and further comprising a plurality of electrical terminals mounted on the card and electrically connected to respective ones of the conductors of the first plurality, and a pair of output terminals mounted on the card and connected to a pair of the conductors of the first plurality; said read-out apparatus including: receptacle means for receiving the card; electrical contacts mounted in said receptacle means for establishing connections with respective ones of the electrical terminals of the first matrix of the master circuit of the card; controllable electrical circuit means connected to the electrical contacts in said receptacle means for completing connections in the master circuit in accordance with a predetermined program, further electric contacts mounted in said receptacle means for establishing connections with the pair of output terminals on the card; and indicator circuitry connected to said further contacts to indicate when a circuit has been completed in the master circuit of the card.

2. The combination defined in claim 1, in which said controllable circuit means includes a plurality of manually operated switches.

3. The combination defined in claim 1, in which said controllable circuit means comprises electronic circuitry forming a master circuit corresponding to the master circuit on the card, and forming additional circuitry for completing the master circuit on the card to establish a read-out indication by the indicating means when said predetermined program has been implemented.

* * * * *